United States Patent Office 2,811,288
Patented Oct. 29, 1957

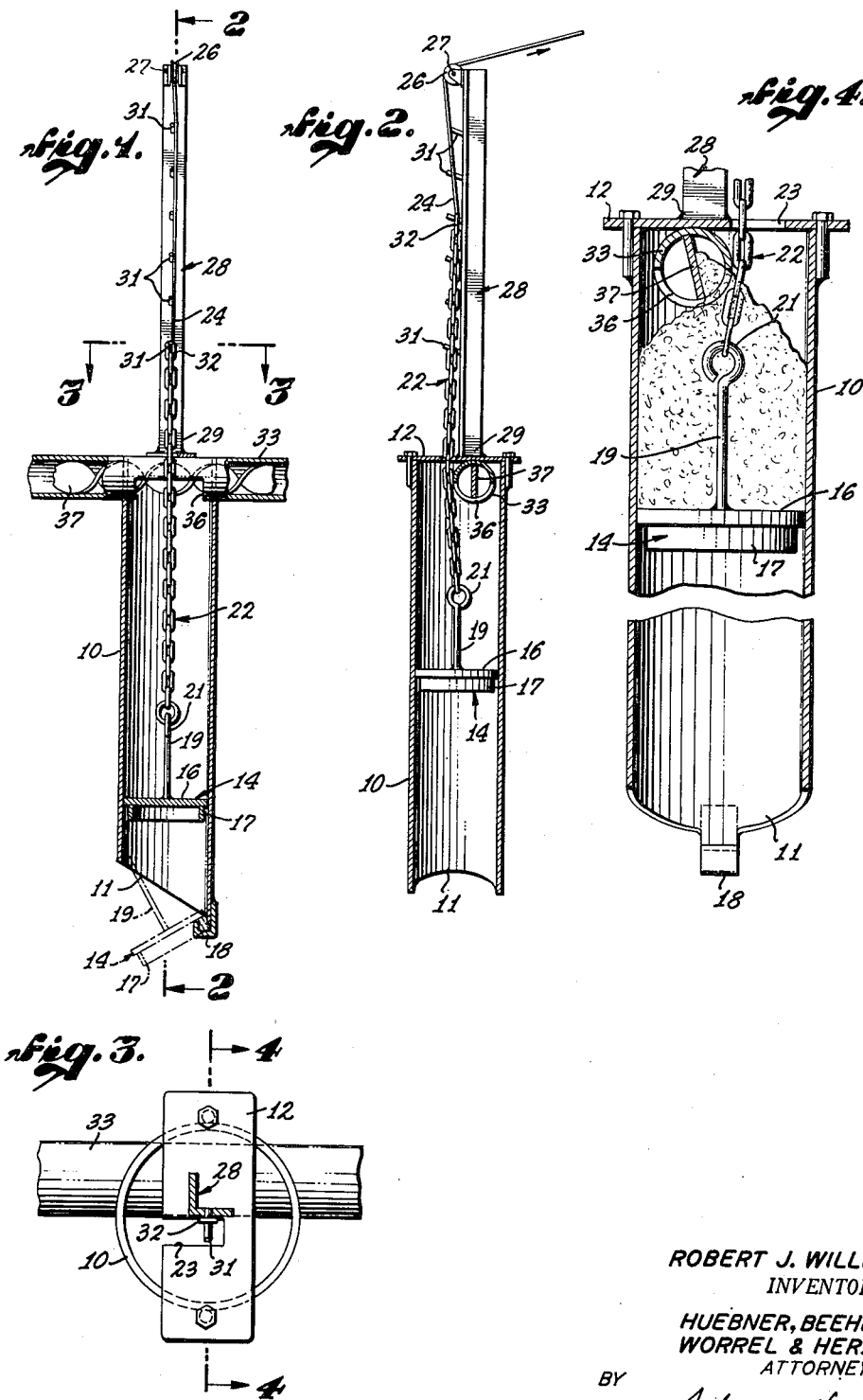

2,811,288
FEEDER FOR LIVESTOCK
Robert J. Willis, San Bernardino, Calif.
Application October 23, 1956, Serial No. 617,708
6 Claims. (Cl. 222—310)

The invention relates to stock feeding, particularly in dairies, and has particular reference to feeding machines and devices adapted to be used where the animals are to be milked.

In the care of livestock, particularly dairy cattle, it has been found that both the health and also the production of the cows, both ultimately and proximately is positively influenced by the quantity of feed consumed. This invention is especially adapted to feed balanced mixtures consumed at the stall and often most conveniently during the milking period, such mixtures commonly comprising grain, beet pulp, copra, minerals and the like.

Studies of heifers and milk cows show that control of the feed, i. e., as to consumption and type, by the cow coming fresh and thereafter during the milking cycle, governs, other things being equal, the milk production curve as to quantity, quality, and overall time, so that an optimum of these factors can be achieved. Each cow thus involves a special, scientifically controllable feed problem, and since the milk production cycle is off coincidence as to the several cows in a herd, each must therefore be given a quantity of feed different from the others. However, the quantity to be given any given animal is subject to variation over time. Thus an apparatus is called for which can vary the amount of feed for each animal at will.

Additionally, the respective quantities to be given should be easily observable by the milker, or handler, and preferably, each cow should be regularly assigned to a particular corresponding stall, and should be tagged for such purpose, as by means of a numbered metal disc tied as through a hole punched in the animal's ear.

The feeding devices should be rugged in construction, as the cows have a tendency to press their noses and tongues against any feed outlet, and to bend, break or damage any but the most unyielding. Also, the individual feed devices should be capable of selectively delivering an initial small quantity of feed at the will of the handler, so that the cow will willingly enter the stall by the enticement of such bait, and then be haltered or otherwise readied for milking, whereupon the remainder of the feed, withheld until the milking can begin, is delivered for feeding the animal simultaneously with the milking operation.

By the exercise of the above precautions, heavier milk quotas, longer milking cycles and healthier animals result.

To facilitate the care of dairy cows in particular, the invention has for an object the accomplishment of the above desired objectives, and to provide a new and improved feeding machine which is capable of delivering to a feeding aperture, or the floor of the feed trough, predetermined quantities of feed suited to the respective animals.

Another object of the invention is the provision of a new and improved feeding container, to facilitate operation thereof, and to render the same free of accumulation otherwise tending to impair free reciprocation.

Also in view of the above and other considerations, it is an object of the invention to provide a new, improved and simplified, foolproof feeding machine for livestock which is quick and accurate in measuring the quantity of feed to be made available and in selectively delivering the measured quantity of feed to a location at which the animal can readily feed.

Still another object of the invention is to provide a number of new and improved feeding machines for livestock which are so constructed that a battery thereof may be arranged in a manner to be filled by a single continuous feed conveyor in such a way that each machine or device will receive only the quantity of feed for which it is set, the mechanism of the feeding being such that each device may be released as desired after the deposition of the measured quantity of feed has been completed by a general charging apparatus preferably common to all such devices.

Still another object of the invention is to provide a new and improved feeding apparatus for livestock which is composed of relatively simple parts and of utmost utility in its construction and assembly, which is relatively inexpensive to manufacture and which is sufficiently simple in its operation as to be capable of use by milkers or other persons not necessarily skilled in the use of analogous devices.

With these and other objects in view, the invention consists in the construction, arrangement and combination of the various parts of the devices and apparatus whereby the objects contemplated are attained, as hereinafter set forth, pointed out in the appended claims and illustrated in the accompanying drawings.

In the drawings:

Figure 1 is an elevational view in section, showing one of the feeding machines embodying this invention mounted as it would be for operation as in a milking stall.

Figure 2 is a vertical sectional view taken on the line 2—2 of Figure 1, showing the plunger in measuring position.

Figure 3 is a cross-sectional view taken as on a line 3—3 of Figure 1 and drawn to a somewhat enlarged scale.

Figure 4 is a sectional elevational view taken as on a line 4—4 of Figure 3.

In the feeding of livestock, but particularly as exemplied herein, in the feeding of dairy cows, it is found, as above stated, that certain animals require more or less feed than others for best milk production, and also for best milk production, and also in the interest of keeping the particular animal in best condition.

In providing such a machine of the herein stated desired type, there is shown a form chosen for purposes of illustration but not of limitation. A vertical tubular member or container 10 which may be of metal or metal tubing having a diameter sufficiently great so that in a relatively short length of the tubular container enough feed may be deposited in order to complete a single desired feeding for one animal. The length of the tubular container should be preferably approximately two to three feet and the container is preferably located approximately one foot above the floor of the feed trough to give the animal access to the feed. It may have a circular, square, or other shaped cross-section.

As shown, there is provided at the bottom of the tubular container a feed outlet 11. The outlet is preferably cut angularly on the end of the vertical tubular container. Said container 10 is also optionally provided with a closed top 12.

Slidably fitted into the interior of the container is a bottom member or plunger 14 having a flat surface 16 forming the top and an annular section 17 fastened to the bottom. The section 17 is made of a diameter designed to hook on the hook 18 fastened on the lowermost portion of the outlet 11. With this arrangement, it will be seen that when the plunger 14 is lowered or dropped it will be caught on hook 18 and tilt as shown in phantom in Figure 1. Its tilting movement will be limited by a rod 19 fastened centrally and vertically of the plunger 14. The plunger tilts until the upper end of the rod strikes the inside wall container 10. The angle of tilt of the plunger 14 is however, made sufficient for particulate feed materials to be discharged from the outlet 11 and to slide off the top 16 of the plunger.

The curved side walls of the plunger are preferably also of a metal construction, such as iron of a similar gauge and thickness to the container 10, about ⅛ inch sheet iron having been used to advantage.

An eye 21 is formed on the upper end of rod 19. Connected to the eye 21 and extending upwardly from the plunger 14 is a chain 22. The chain extends through a hole 23 in the top 12, which is materially greater than the chain so as in no way to restrict its movement. To the upper end of chain 22 is attached a rope or cable 24 which is reeved about a pulley 26. The pulley is secured by a bracket 27 at the upper end of a stationary supporting frame, including a vertically positioned piece, as of angle iron 28. The angle piece in turn is secured as by welding at the lower end region 29 to the top 12 of the tubular container. The angle piece is positioned on top 12 so that the pulley 26 is positioned above hole 23 with bracket 27 attached to the outer face of one side of angle piece 29. Also attached to angle piece 29 in spaced relationship below pulley 26 is a series of pegs 31. The pegs function as graduations adapted to indicate the position of the plunger 14, and show the quantity of feed within the container at any position of the plunger. The pegs are angled upward slightly to more positively position the plunger hanging from chain 22 supported at upper link 32 on one of the pegs.

To hold and release the plunger alternately, the upper end link 32 of the chain 22 is hung on the particular peg which is determined by the amount of feed a particular animal should have. The amount of feed the animal should have is known or determined in advance. The length of chain 22 passes from the eye 21 upwardly at a slight angle to the vertical because of a deflection produced in the chain by contact with the conveyor channel 33. From the point of contact with the conveyor channel the chain passes to the peg 31 on which the chain is hung. The section of chain passing from the conveyor channel to the peg also is deflected slightly from the vertical. This latter deflection is sufficient to cause upper end link 32 to become unhooked from the peg 31 on which it is hung when a pull in the direction of the arrow is applied to the rope or cable 24. After the link 32 is disengaged from the peg 31, the section of chain running from the conveyor channel 33 to the mounting peg is pulled clear of the pegs 31 because the straight line running from the point of engagement of the chain on the conveyor channel to the pulley 26 is substantially vertical and is free of the tips of pegs 31. The plunger 14 can then be lowered or dropped to the feed discharge position shown in phantom in Figure 1.

The conveyor channel 33 is provided to deliver quantities of feed to the tubular container 10. It is shown as round but can be made square or of any other suitable cross-sectional shape. The channel extends across the container top as through an appropriate transverse opening 34 located at the upper end of the container immediately below the top 12. The transverse opening, if desired, is continuous on opposite sides of the wall of the container. The tubular conveyor channel 33 optionally passes entirely through the opening 34 and, if so, has a cut-away portion 36 located within the vertical container and directed downwardly. Within the channel 33 is a longitudinally travelling conveyor 37 which, as shown, is of a screw type. Upon longitudinal movement of the conveyor within the channel, it is adapted to draw feed from a hopper or bin moving the feed by operation of the conveyor to the cut-away portion 36, at which point the feed is adapted to drop into the vertical container. It is to be understood that the movable conveyor 37 can comprise merely a loosely contained link chain, or any other form of drag or screw which will serve, when drawn through the conveyor chanel 33, to pull the therein entrapped feed with it. It is also immaterial whether the conveyor 37 is continuous through the container 10 or not, because the feed will be dragged along from container to container until all are filled.

Thus, in operation the apparatus is ordinarily set up in batteries so that there is one feeder 10 for each of the conventional stalls, the machine being set at one end of each stall, usually the inside end, above the feed trough to deposit its load centrally thereof. As has been indicated, the tubular containers 10 comprising the feeders are preferably located in parallel relationship so that the casing containing the conveyor 37 may extend from a feed bin to one vertical container 10 and on through several others, and then, if desired, to another feed bin, although one such bin or hopper is adequate and the feed is easily and rapidly conveyed therefrom to any number of feeders.

Since in practice each animal is regularly assigned to its own special stall, the feeder or feeding machine for each stall will ordinarily be set to measure the correct predetermined amount of feed for that animal for that feeding. The pegs 31 on the angle piece are used as a means of determining the setting of the plunger 14. A special movable marker can, if preferred, be placed upon or clamped to the angle piece and the top end link 32 lifted to a level of that mark each time.

When the upper end link 32 of the chain connected to the plunger has been lifted, usually by means of the cable or rope 24, the top link 32 is hooked on the desired peg 31 as shown in Figures 1 and 2. The peg 31 will then hold the plunger 14 in the appropriate feed measuring position. Examples of this position are illustrated in Figures 1, 2 and 4 wherein the plunger is located approximately one-fourth, one-half and two thirds of the way, respectively, between its lower and uppermost positions. With the plunger for each container in its properly selected position, the conveyor 37, in common to all feeders, may be started. Feed is drawn through the channel 33 by the conveyor and as the feed reaches each container in turn it is dropped into the container. As one container is filled to the level of the screw conveyor, no further feed will be deposited into that container, but the feed in the conveyor will be carried on to successive containers until all of them are filled. If the screw conveyor continues to run for a short length of time after all of the containers are filled, then the surplus feed will be delivered to the feed bin at the end of the conveyor. Should it be desired to mount the containers about the perimeter of a somewhat circular track, the conveyor may be directed back to the feed storage bin from which the feed is initially drawn.

All of the containers have thus been filled within a measured quantity of feed, depending upon the position of the plunger in each particular instance. They are then ready to discharge their feed when links 32 are unhooked by pulling ropes 24, as described above. For convenience a single rope or bar may be connected to all of the trip ropes 24, so that by a single operation all may be released simultaneously. Usually, however, the cows are individually induced to enter their own stalls as follows:

The plungers 14 are all raised to their substantially utmost upper limits, thus leaving a minimal volume at the top of each feeder 10 into which feed is initially introduced by the conveyor 37. The handler then, by jerking on one of the control ropes or cables 24, causes the plunger 14 to fall to the hook 38 at the bottom of the container and deliver its small amount of feed into the feed trough. Any animal in question will then readily enter her stall. The plungers are again raised by the respective handler or handlers to a height corresponding to the desired amount of feed to be delivered to the respective cows. These may be raised manually, automatically, by pneumatic means, electrically, or otherwise, within the ability of one skilled in the art and by means of adjustable stops on the feeders. In any event, as described above, the ropes or cables 24 can be manipulated conveniently from anywhere in the stalls, and are preferably tripped with the final feeding, optionally after the deduction of the amount of the initial "bait," when the milker is ready to attend and milk the cow.

There has thus been described and illustrated herein a feed container capable of measuring accurately quantities of certain kinds of feed which can be delivered by any conveyor, the machine being constructed of relatively few parts, with clearances sufficiently great to assure movement of the moving parts under all circumstances, and also one so simple in its mode of operation as to be capable of use under many varied conditions and by persons not expert in the manipulation of mechanisms. The plungers preferably drop gravitationally, with sufficient of a slap to knock all loose feed out of the feeder at the outlet end 11. The plunger 14 is designed for avoiding jamming of the plunger against the inside walls of the feeder.

It will be understood that although a chain 22, rope or cable 24 and pegs 31 have been shown for temporarily holding the slidable bottom member 14 in an upper feed measuring position, other positioning means can be used for this purpose. Also, it will be understood that other remote control means can be used for releasing the bottom member from the feed measuring position to lower or drop it to the feed-discharge position below feed outlet 11, than the rope or cable 24, pulley 26 and bracket 27.

For example, stop means projecting through the walls of the tubular member 10 can be used to temporarily position the bottom member 14 and mechanical, electrical, hydraulic or other remote control means can be connected to such stop means for releasing and lowering or dropping the bottom member 14 to the feed-position.

The bottom member 14 can, of course, have any suitable structure or construction for any specific modification of the tubular member 10, and of the temporary holding means. Furthermore, the bottom member 10, instead of being dropped and caught on hook 18, may be lowered mechanically, electrically, hydraulically, or otherwise, to the feed-discharge position below feed outlet 11.

This invention features a scientific feeding apparatus especially suited for dairy use and utilizing a minimum amount of easily cleanable, hence sanitary, parts of rugged construction, to provide an optimum of convenience and utility, both individually as to one feeder or collectively as to all of them. Moreover, it features an apparatus of the desired character described which has proven foolproof utility in use, capable of easy and economical manufacture and universally applicable to any conventionally equipped dairy, with a resultant economy of time in use, an improved milk output, and increased sanitation.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A feeding device for cattle comprising a vertical tubular container having a feeding aperture therein, a plunger slidably mounted in the container having a lowermost position below the aperture, said container having an opening at the top, a feed conveyor extending into the opening, and a hook means adapted to temporarily hold the plunger in an upper feed measuring position in the container intermediate the top and bottom thereof whereby a limited quantity of feed is received therein, said hook means being releasable whereby the plunger is adapted to drop to the lowermost position and the feed supported thereby is delivered to the feeding aperture.

2. A feeding device for cattle comprising a vertical tubular container having a laterally directed feeding aperture at the bottom, a plunger slidably mounted in the container having a lowermost position below the aperture, said container having a transverse opening at the top, a screw feed conveyor extending through the opening, counter balance means for the plunger, and a hook means engageable with the counter balance means adapted to temporarily hold the plunger in a feed measuring position in the container intermediate the top and bottom thereof whereby a limited quantity of feed is received therein, said hook means being releasable whereby the plunger is adapted to drop to the lowermost position and the feed supported thereby is delivered to the feeding aperture.

3. A feeding device for cattle comprising a vertical tubular container having a laterally directed feeding aperture at the bottom, a plunger slidably mounted in the container having a lowermost position below the aperture, said container having a transverse opening at the top, a screw feed conveyor extending through the opening, an upwardly directed extension on the plunger, counter balance means including a pulley support therefor attached to the extension, and a hook means above the top of the container engageable with the extension adapted to temporarily hold the plunger in an upper feed measuring position in the container intermediate the top and bottom thereof whereby a limited quantity of feed is received therein, said hook means being manually releasable whereby the plunger is adapted to drop to the lowermost position and the feed supported thereby is delivered to the feeding aperture.

4. In a feeding device for cattle a vertical tubular container comprising one of a battery of similar containers, said container having a laterally directed feeding aperture at the bottom, a plunger slidably mounted in the container having a lowermost position below the aperture, said container having a transverse opening at the top, a screw feed conveyor adapted to communicate between a source of supply and each container extending through said lateral opening, an upwardly direction extension on the plunger, counter balance means therefor attached to the extension, and a hook means above the top of the container engageable with the extension adapted to temporarily hold the plunger in an upper feed measuring position in the container intermediate the top and bottom thereof whereby a limited quantity of feed is received therein, said hook means being manually releasable whereby the plunger is adapted to drop to the lowermost position and the feed supported thereby is delivered to the feeding aperture.

5. A feeder for livestock comprising a substantially vertical tubular member having a feed-discharge opening in the lower end thereof, a slidable bottom member disposed in the tubular member, positioning means for temporarily holding the bottom member in an upper feed measuring position, a feed conveyor for charging feed to the tubular member, and remote control means for releasing the bottom member from the feed measuring position to lower it below the feed-discharge opening.

6. A feeder for livestock comprising a substantially vertical tubular member having a feed-discharge opening in the lower end thereof, a slidable bottom member disposed in the tubular member, a plurality of vertically spaced hook means positioned above the tubular member, connecting line means extending from the bottom member to the hook means for temporarily holding the bottom member in an upper measuring position, a feed conveyor for charging feed to the tubular member, and remote control means for releasing the bottom member from the feed measuring position to drop it below the feed-discharge opening.

No references cited.